Feb. 15, 1944.  A. R. LEUKHARDT  2,341,631
CLUTCH CONTROL MECHANISM
Original Filed July 12, 1938
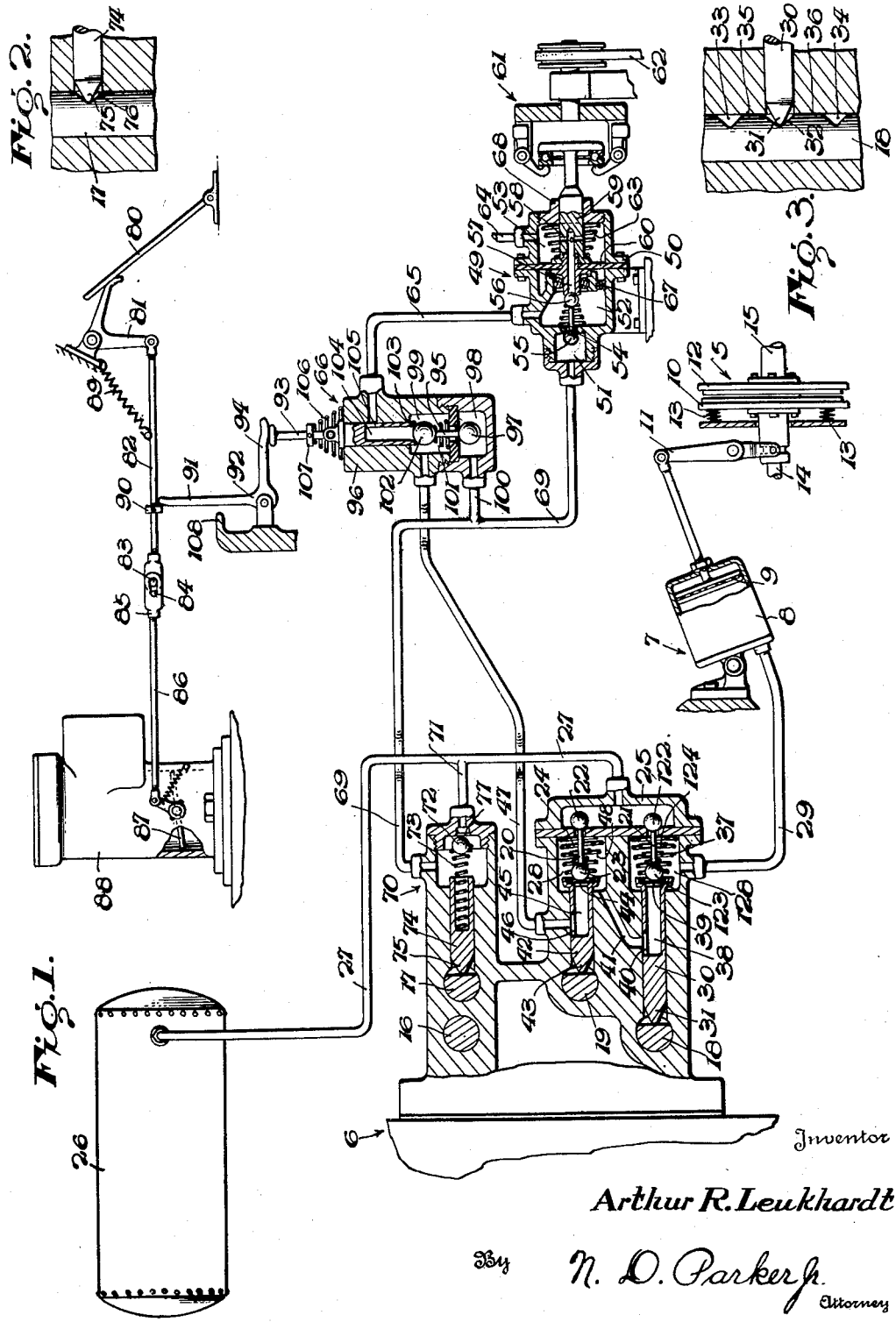
Inventor
Arthur R. Leukhardt.
By N. D. Parker Jr.
Attorney Patented Feb. 15, 1944

2,341,631

UNITED STATES PATENT OFFICE 2,341,631

CLUTCH CONTROL MECHANISM

Arthur R. Leukhardt, New York, N. Y., assignor to Bendix-Westinghouse Automotive Air Brake Company, Pittsburgh, Pa., a corporation of Delaware Original application July 12, 1938, Serial No. 218,843. Divided and this application May 21, 1941, Serial No. 394,565

12 Claims. (Cl. 192—.01)

This invention relates to motor vehicle clutch controlling mechanism and more particularly to a control device for coordinately controlling the operation of such a mechanism with other vehicle controls, such as the gear shifting apparatus and/or the accelerator pedal.

In one type of clutch operating mechanism heretofore provided, the vehicle clutch has been controlled by the operation of a suitable power device, and the energization of the latter has been determined by the speed of the vehicle engine. More particularly, in such prior installations, increase in engine speed above a predetermined idling speed has determined the rate of deenergization of the clutch controlling power device and hence the rate of clutch engagement. In adapting such devices to vehicles now in use, several problems have been presented. Among these is the variation in force required to complete disengagement of the clutch. For example, in certain installations, it has been found that a force in excess of two hundred pounds has been necessary to effect a disengagement of the relatively movable members of the clutch. Approximately two hundred pounds of this force has been required to overcome the mechanical friction inherent in the clutch. Hence, in permitting engagement of such a clutch, the disengaging force must be reduced two hundred pounds before the clutch begins to engage through the action of the usual return springs associated therwith. In devices of the character under discussion, the engagement of the clutch has been rather sudden after the disengaging force has been reduced by the amount indicated above.

It is accordingly one of the objects of the present invention to provide a clutch controlling mechanism which shall be operable to efficiently disengage the clutch and permit a graduated and smooth reengagement thereof.

Another object is to provide a combined gear shift and clutch controlling mechanism, so constituted as to provide automatic clutch operation during shifting of gears, such clutch operation insuring complete clutch disengagement between shifts and enabling graduated engagement in accordance with increase in engine speed.

Another object is to provide a novel arrangement for controlling the operation of a power device for a vehicle clutch, such arrangement securing a finely graduated control of the power device during increase in the engine speed above a predetermined idling speed, whereby the clutch engagement may be smoothly effected.

Still another object is to provide a novel arrangement for securing graduated clutch engagement in accordance with increase in engine speed and wherein the initiation of the engagement of the clutch may be controlled by operation of the accelerator pedal.

A further object is to utilize, in a controlling apparatus of the above character, a slight movement of the engine accelerator or other vehicle controlling member for quickly reducing the degree of energization of the clutch operating power device to the point where initial engagement occurs and to thereafter graduate the further deenergization of the device in accordance with increase in engine speed.

A still further object is to provide a novel and relatively simple mechanism for securing the above mentioned desirable results and advantages, and one which is so constructed and arranged as to be capable of ready adaptability to vehicles now in use.

Other objects and novel features of the invention will appear more fully hereinafter from the following detailed description when taken in connection with the accompanying drawing, wherein one form of the invention is illustrated. It is to be expressly understood, however, that the drawing is utilized for purposes of illustration only and is not designed as a definition of the limits of the invention, reference being had to the appended claims for this purpose.

In the drawing, wherein similar reference characters refer to like parts throughout the several views:

Fig. 1 is a diagrammatic view, partly in section, of a combined gear shifting and clutch controlling mechanism constructed in accordance with the principles of this invention;

Fig. 2 is a sectional detail of one of the shifter bars, and

Fig. 3 is a sectional detail of another of the shifter bars.

Referring more particularly to Fig. 1, there is disclosed therein a motor vehicle clutch controlling mechanism constructed in accordance with the principles of the present invention, the same embodying a clutch 5, a gear shifting mechanism 6, and an arrangement for coordinately controlling the clutch upon operation of the gear shifting mechanism, as will be more particularly described hereinafter.

Power means are provided for causing disengagement of the vehicle clutch and for initiating engagement thereof and, in the form shown, such power means include a fluid pressure operated motor 7 having relatively movable cylinder and piston elements 8 and 9. The latter is connected to a movable member 10 of the clutch through a suitable linkage 11, the construction being such that, with the piston 9 in the position shown, the clutch member 10 is moved out of engagement with respect to the clutch member 12, and the clutch return springs 13 are compressed. Upon deenergizaion of the motor 7, the clutch springs 13 are effective to move the clutch member 10 into engagement with the clutch member 12 in order to effect a driving connection between driving and driven shafts 14 and 15 respectively.

The gear shifting mechanism 6 includes a pair of primary shifter bars 16 and 17, capable of being selectively engaged and moved in opposite directions by any suitable mechanism, not shown. For example, manually operable means, such as the usual gear shift lever found in gear shifting mechanisms now in general use, may be employed for selectively engaging and moving the primary shifter bars 16 and 17. However, it is to be understood that the invention is not limited to the manual operation of these bars since any suitable means may be utilized, it being only necessary that the bars be shifted longitudinally for the purpose of establishing a desired gear relation. The primary shifter bar 16 is secured or operatively connected to a secondary shifter bar 18 in any suitable manner, not shown, so that longitudinal movement of the bar 16 will move the bar 18 in a similar direction. A secondary shifter bar 19 is likewise operatively connected to the bar 17 and moves with the latter. The secondary shifter bars 18 and 19 are respectively operably connected to the shiftable transmission gears and the construction is such that longitudinal movement of the interconnected shifter bars 16 and 18 in opposite directions will serve to establish first and reverse gear ratios, while combined movement of the interconnected shifter bars 17 and 19 in opposite directions will serve to establish third and second gear ratios.

In order to effect automatic operation of the clutch 5 as the various gear relations in the transmission 6 are established, means are associated with the shifter bars of the transmission for coordinately controlling the energization of the fluid motor 7. As shown, such means include a pair of valve mechanisms 20 and 21 respectively associated with the shifter bars 19 and 18. Each of these valve mechanisms includes intake portions 22 and 122 and exhaust portions 23 and 123, spring 24 and 124 serving to maintain the respective valves in the positions shown when the gear shift is in neutral or in one of the gear-engaged positions. The intake valve portions 22 and 122 are housed within a casing 25 adapted to be supplied with fluid pressure from a reservoir 26 by way of conduit 27. The exhaust valve portions 23 and 123 are respectively housed within chambers 28 and 128, the chamber 128 communicating with the fluid motor 7 by way of conduit 29. A valve operating member 30 is provided for the valve 21, and, as will be seen more particularly from Fig. 3, this operator is provided with a cam-shaped extremity 31 adapted to be received within notches 32, 33 or 34 of the shifter bar 18. Notch 32 corresponds to the neutral position of the bar, while notches 33 and 34 respectively correspond to first and reverse gear relations. Intermediate the notches, the shifter bar 18 is provided with cam portions 35 and 36 which cooperate with the extremity 31 of member 30 to shift the same to the right, as viewed in Fig. 1, during longitudinal movement of the shifter bar. Member 30 is constantly urged into engagement with the shifter bar 18 by means of spring 37, this construction permitting the valve 21 to close whenever the extremity 31 is in registry with one of the notches of the shifter bar.

The valve operating member 30, see Fig. 1, is provided with an interiorly disposed bore 38 having an exhaust valve seat 39 formed in one end, and having also a laterally disposed opening 40 which constantly establishes communication between the bore 38 and a duct 41, irrespective of movement of the member 30. Duct 41 communicates with the chamber 28 of valve 20, and, from this arrangement, it will be perceived that the last named chamber is in constant communication with bore 38.

Valve 20 is provided with a valve operating member 42 constructed similarly to the valve operating member 30. As shown, the member 42 is provided with a cam-shaped extremity 43 which is adapted to be received within notches formed in the shifter bar 19. That is, referring to Fig. 3, the extremity 43 of member 42 may be received in any one of three notches positioned along the length of shifter bar 19 in precisely the same manner as is shown in Fig. 3 in connection with shifter bar 18. In view of this similarity of construction, it is not considered necessary to illustrate the notches on shifter bar 19. As in the case of shifter bar 18, when the extremity 43 of member 42 engages the center notch, the shifter bar 19 is in neutral position. When either of the outer notches is engaged, however, the shifter bar is in second or third gear relation.

The valve operating member 42 is provided at its opposite extremity with an exhaust valve seat 44, see Fig. 1, and is formed with an interior bore 45 having a lateral opening 46 in constant communication with a conduit 47, this arrangement being provided for a purpose which will appear more fully hereinafter.

With the construction heretofore described, it will be readily understood that the chamber 25 is constantly supplied with a source of fluid pressure from reservoir 26 through conduit 27. Hence, movement of either of the valve operating members 30 or 42 to the right, as viewed in Fig. 1, will move the respective valves 21 or 20 to such a position as to open the intake valve portions thereof. It is to be pointed out that the arrangement of the cams on the shifter rods is such that the movement of the valve operating members occurs prior to actual engagement or disengagement of the transmission gears, either the lost motion inherent in the gear shifting mechanism being utilized for this purpose, or, if this is found insufficient, a lost motion connection may be provided between the shifter bars 18 and 19 and the shiftable gears operated thereby.

In the event that valve 21 is moved so that the intake portion 122 thereof is opened, fluid pressure will be conducted from chamber 25 to the clutch motor 7 by way of chamber 128 and conduit 29. As soon as valve operating member 30 is received within one of the outer notches of the shifter bar 18, following the establishment of the desired gear relation during disengagement of the clutch, the fluid motor 7 will be exhausted by way of conduit 29, chamber 128 associated with valve 21, bore 38, opening 40, duct 41, chamber 28 associated with valve 20, bore 45, opening 46 and conduit 47 in a manner which will appear more fully hereinafter.

The clutch motor 7 will be energized in a somewhat similar manner upon operation of the shifter bar 19 to effect a desired gear relation. In this instance, when the latter is moved, valve operating member 42 will be shifted to the right by reason of one of the cams on the shifter bar, and exhaust valve seat 44 will engage the exhaust valve 23 of valve 20. The latter will be moved to the right, opening the intake valve 22, thus connecting chamber 25 to the clutch motor by way of chamber 28, duct 41, opening 40, bore 38, chamber 128, and conduit 29. Following the establishment of the gear relation and the registry of member 42 with the proper notch of the shifter bar 19, the said member will be returned to the position shown by means of a spring 48. Thus the chamber 28, in communication with the clutch motor 7 through the connections above specifically described, will be connected to conduit 47 by way of duct 45 and opening 46. It will hence be understood that the construction heretofore described will enable synchronized energization and deenergization of the clutch motor 7 to be secured as the shifter bars 18 and 19 are moved to establish desired gear relations.

Th present invention, in addition to providing means for controlling the energization of the clutch motor in accordance with movements of the gear shifting mechanism, also includes a mechanism for energizing the clutch motor when the speed of the vehicle has reached a predetermined low idling speed. Such mechanism is also utilized for controlling the deenergization of the clutch motor through conduit 47, and the construction is such that such deenergization will take place in a manner to secure a finely graduated and efficient engagement of the clutch, thereby eliminating jerky movement of the vehicle after a desired gear relation has been effected. As shown, such mechanism includes a valve device 49 constructed in a manner similar to that disclosed in the application of Roy S. Sanford, Serial No. 171,570, filed October 28, 1937, now Patent No. 2,228,611, dated January 14, 1941. More particularly, such valve mechanism includes a housing 50 having inlet, outlet and exhaust chambers 51, 52 and 53 respectively. A valve 54 having interconnected intake and exhaust portions 55 and 56, respectively positioned in chambers 51 and 52, is provided for controlling the flow of fluid pressure to the valve device 49. Intake portion 55, when open, establishes communication between chamber 52 and chamber 51. Valve 56, when open, serves to connect chambers 52 and 53 by way of port 57 and openings 58 formed in a valve operating member 59. The latter is secured to a diaphragm 60 and is capable of longitudinal shifting movement through the action of a suitable centrifugally operable device 61 drivably connected through a belt 62 to any movable part of the engine which is proportional to the engine speed. Upon increase of engine speed, mechanism 61 tends to move member 59 to the right against the tension of a spring 63. Thus, upon increase of engine speed, valve operating member 59 will move away from exhaust valve portion 56 to connect the outlet chamber 52 with the exhaust chamber 53, the latter communicating with the atmosphere through a conduit 64. At engine idling speed, however, the tension of spring 63 may be so adjusted as to cause member 59 to contact exhaust valve portion 56, thus opening intake valve portion 55 and connecting chambers 51 and 52. The latter is in constant communication with a conduit 65 which is adapted to be connected to or disconnected from conduit 47 through the operation of a valve mechanism 66 to be referred to more particularly hereinafter.

It is desired to particularly point out that the valve mechanism 49 is of the self-lapping type in that the diaphragm 60 is subjected to the fluid pressure within outlet chamber 52 through a choke 67. The construction is, moreover, such that the tension of spring 63 may be adjusted through a threaded member 68 so that the valve mechanism is capable of graduating the exhaust of fluid pressure from a predetermined maximum down to zero in accordance with increase in engine speed. This arrangement will be referred to more fully hereinafter.

Fluid under pressure is conducted to the inlet chamber 51 from the reservoir 26 through a valve device 70, controlled by movement of the primary shifter rail 17, said valve device being connected with the reservoir by conduits 71 and 27 and with chamber 51 by way of conduit 69. With the gear shift in the neutral position shown, and assuming valve 66 to be conditioned to establish a connection between conduits 47 and 65, in a manner to be described more fully hereinafter, fluid pressure conducted to the inlet chamber 51 will be fed to conduit 47 past the open intake valve 55, chamber 52, conduit 65 and valve 66. It will be understood from the construction previously described that conduit 47 communicates with the clutch motor when the gear shift is in neutral. Thus, under these conditions, the valve mechanism 49 will be effective to cause disengagement of the vehicle clutch. This action is predicated on the assumption that spring 63 is so adjusted as to maintain the intake valve 55 in open position with the engine idling. A modified action will be secured with a different adjustment of spring 63, as will appear more fully hereinafter.

The present construction, in addition to the above, also enables the disengagement of the vehicle clutch by operation of valve mechanism 49 when the gear shifting mechanism is established in either first or reverse gear relations. Under these conditions, fluid pressure is conducted from valve mechanism 49 to the clutch motor in precisely the same manner as that above indicated, assuming that the spring 63 is adjusted as above indicated. However, in the event that second or third gear relation is established, thus necessitating the movement of the primary shifter bar 17, the supply of fluid pressure from conduit 27 to conduit 69 is shut off by valve device 70. Thus, even though the engine speed drops sufficiently low as to open the intake valve 55 of valve mechanism 49, still the clutch would not become disengaged. This action results from the use of the valve device 70 which includes a valve 72, engaged by a spring 73, which, when the shifter bar 17 is in neutral position, is fully extended and permits the valve 72 to be opened. Spring 73 is carried by a valve operating member 74 which has a cam-shaped extremity 75 adapted to be received within notch 76 of the shifter bar 17, see Fig. 2. When the shifter bar 17 is moved out of neutral, to establish second or third gear relation, the extremity 75 rides out of the notch 76 and hence member 74 is moved to the right, as viewed in Fig. 1, in order to compress spring 73 and move valve 72 tightly against a seat 77. The spring 73 is so constructed that, under these conditions, the valve 72 will remain closed against the pressure existing in conduit 71. Thus, whenever the transmission is established in second or third gear ratios, communication between conduits 69 and 71 will be cut off and valve mechanism 49 will not conduct fluid pressure to the clutch motor.

As has heretofore been stated, certain clutches utilized in present day practice have a relatively high mechanical friction loss which must be overcome before the clutch springs are compressed to secure disengagement of the clutch. With the clutch disengaged, the force necessary to overcome the mechanical friction loss must be relieved before the clutch starts to reengage. If the centrifugally controlled valvular mechanism 49 disclosed herein were to graduate the release of not only the force required to overcome friction loss but also the force required to overcome the energy of the clutch return springs, the engagement of the clutch may not be as gradual and smooth as may be desired, especially if the clutch has a high mechanical friction loss compared with the force necessary to actually disengage the clutch through the compression of the clutch return springs.

The present invention accordingly includes a construction wherein the action of the centrifugally controlled mechanism upon valve 49 serves only to regulate the deenergization of the clutch motor after the latter has been deenergized to an extent substantially proportional to the force required to overcome the mechanical friction loss of the clutch.

In order to accomplish the above results, the valve mechanism 49 is so adjusted that, when the engine is idling, the valve mechanism will hold within chamber 52 a fluid pressure corresponding to that required in the clutch motor to hold the relatively movable members of the clutch 5 in very slight engagement. This is accomplished by adjusting member 68 and hence the tension of spring 63. Under these conditions, the valvular mechanism 49 operates as a pressure reducing valve and exhausts all fluid pressure in excess of the amount just indicated. Also it will be understood that with the spring 63 adjusted as indicated, the valves 55 and 56 will occupy the lapped position shown on Figure 1, assuming that there is fluid pressure in the system and that the engine is idling.

With the clutch motor 7 supplied with reservoir pressure, which is sufficient to overcome the mechanical friction loss of the clutch and to hold the clutch members fully disengaged, it is desirable, as above stated, to deenergize the clutch motor 7 down to the point where the clutch plates are in slight initial engagement. Preferably, this partial deenergization of the clutch motor should be effected rapidly and without any increase in the speed of the engine. For this purpose, valve 66 is provided and is operatively associated with the throttle operating member or accelerator pedal 80 through a bell crank 81, one end of which is connected to a rod 82. The free end of the latter is provided with a pin 83 positioned within a slot 84 formed in a fitting 85 carried by a throttle control rod 86, the latter being associated with throttle valve 87 of the engine carburetor 88. A spring 89 normally tends to hold the accelerator rod 82 in the position shown where a collar 90 on rod 82 engages arm 91 of bell crank 92 in order to move valve operating member 93 downwardly through cooperation with arm 94. In this position of the valve operating member 93, a valve 95 housed within a casing 96 is moved to such a position that the intake valve portion 97 connects intake chamber 98 and outlet chamber 99, thus establishing communication between a conduit 100, connected with conduit 69, and conduit 47. Under these conditions, fluid pressure from conduit 69 will be conducted to conduit 47 and from the latter to the clutch motor 7 by way of conduit 100, chamber 98 and chamber 99, and the pressure for the clutch motor 7 will be substantially equal to that in the supply reservoir 28. The clutch will therefore be disengaged. A spring 101 constantly tends to urge valve 95 upwardly, as viewed in Fig. 1, and, with the parts in the position shown, urges exhaust valve portion 102 into contact with an exhaust valve seat 103 formed on the lower end of member 93. The latter is provided with an interiorly disposed bore 104 having an opening 105 in constant communication with conduit 65 so that, when exhaust valve 102 is disengaged as respects its seat, conduit 47 is connected with conduit 65 through chamber 99, bore 104 and opening 105. When the accelerator pedal 80 is depressed and pin 83 carried by rod 82 is moved in slot 84, a spring 106 interposed between casing 96 and a collar 107, carried by member 93, is effective to move the latter upwardly to such a position that arm 91 engages a fixed stop 108. These parts are so constructed and arranged that, when this operation occurs, intake valve 97 closes, exhaust valve 102 is opened, and fluid pressure from the clutch motor is conducted to conduit 47, by the connections heretofore set forth, and from the conduit 47 to conduit 65, through the valvular mechanism 66. As soon as this pressure, which is the same as that in the reservoir, is led from conduit 65 to the outlet chamber 52, the same will act upon diaphragm 60 through the choke 67 and will move valve operating member 59 to the right against the tension of spring 63 to open the exhaust valve portion 56. Thus, fluid pressure in chamber 52 will be exhausted to atmosphere by way of valve portion 56, the duct 57, openings 58 and exhaust chamber 53, and this reduction in pressure will continue until the pressure is decreased to the value determined by the initial adjustment of spring 63. As soon as the pressure has been reduced to this amount, the exhaust valve 56 will be closed and no further reduction in the pressure within clutch motor 7 will occur, the valve 54 under these conditions being lapped. At this stage of the operation, the pressure remaining in the clutch motor 7 is just sufficient to permit light initial engagement of the clutch plates. Further reduction in the energization of the clutch motor in order to secure smooth and gradual engagement of the clutch will take place as the engine speed is increased, through depression of the accelerator pedal, the centrifugally controlled mechanism 61, under these conditions, serving to move valve operating member 59 to the right, as viewed in Fig. 1, in order to graduate the release of fluid pressure in chamber 52. It will be understood, however, that in the event the initial engagement of the clutch causes a drop in engine speed due to the load imposed on the engine, the force exerted by the mechanism 61 to maintain the exhaust valve 56 in open position will be decreased and the member 59 will be moved to the left by the spring 63 to first close the exhaust valve and under some conditions to subsequently open the inlet valve 55 to admit additional fluid pressure from the reservoir to the fluid motor 7 through conduit 65 and the valve 66 in order to partially disengage the clutch and prevent stalling of the engine. Thus the valve 49 is normally effective to control the release of fluid pressure from the clutch motor in order to effect engagement of the clutch, but under conditions such that the increased load imposed on the engine tends to decrease the speed of the engine or to stall the same, it will be apparent that when the accelerator pedal is depressed sufficiently to operate the valve mechanism 66 to establish a connection between conduits 47 and 65, the centrifugal valve 49 will also be effective to again supply fluid pressure to the clutch motor, as above set forth, in order to effect a release of the clutch plates to prevent stalling of the engine. Hence with the accelerator pedal depressed sufficiently to operate the valve 66 to disestablish the connection between conduits 100 and 47 and to establish a connection between conduits 47 and 65, the centrifugal valve 49 is operable to control both the application and release of fluid pressure from the clutch motor in accordance with variations in the speed of the engine. Thus the centrifugally controlled valvular mechanism 49 will be able to closely and finely graduate the release of pressure from the clutch motor to secure smooth clutch engagement.

There has thus been provided by the present invention a novel arrangement for securing coordinated power operation of the vehicle clutch during shifting movement of the vehicle transmission. The arrangement is such that no special attention or manipulation need be practiced by the operator, it being merely necessary to decelerate the engine prior to shifting and to accelerate the engine after the desired gear relation has been established. Of particular importance is the arrangement provided, wherein efficient and gradual clutch engagement may be secured notwithstanding the fact that a substantial force is necessary to overcome the mechanical friction losses in the clutch mechanism.

While one embodiment of the invention has been illustrated and described with considerable particularity, it is to be understood that various modifications may be resorted to without departing from the spirit of the invention, as will be understood by those skilled in the art. Reference will, therefore, be had to the appended claims for a definition of the limits of the invention.

This application is a division of my application Serial No. 218,843, filed July 12, 1938, now Patent No. 2,273,277, dated February 17, 1942.

What is claimed is:

1. In an automotive vehicle provided with an internal combustion engine, an accelerator and a clutch, fluid pressure power means for operating the clutch to cause engagement and disengagement thereof, and means for controlling said power means including accelerator-controlled mechanism for effecting fluid pressure energization of the power means for causing clutch-disengaging operation of the latter and for effecting fluid pressure deenergization of the power means for initiating clutch-engaging operation of the latter, said controlling means including means responsive solely to engine speed for controlling the remaining clutch-engaging operation of the power means after the initiation of clutch engagement.

2. In an automotive vehicle provided with an internal combustion engine, an accelerator and a clutch, fluid pressure power means for operating the clutch to cause engagement and disengagement thereof, and means for controlling said power means including accelerator-operated mechanism for effecting fluid pressure energization of the power means for causing clutch-disengaging operation of the latter and for effecting fluid pressure deenergization of the power means for initiating clutch-engaging operation of the latter, said controlling means including a preset valve device for controlling the operation of the power means to secure a rapid engaging movement of the clutch substantially up to the point of initial engagement, and means for thereafter operating said valve device solely in accordance with the speed of the engine for securing a controlled engagement of the clutch.

3. In an automotive vehicle having an internal combustion engine, an accelerator and a clutch, power means for controlling the clutch-engaging and clutch-disengaging movements of the clutch, and means for controlling the operation of the power means including a fluid pressure system having an accelerator-controlled valve for effecting fluid pressure energization of the power means to disengage the clutch, said control means having also a valve operable solely in accordance with the speed of the engine, said last named valve being operable in said system to control the fluid pressure deenergization of the power means to regulate the clutch-engaging movement of the latter as the speed of the engine is increased.

4. In an automotive vehicle having an internal combustion engine, an accelerator and a clutch, a fluid pressure motor for controlling the clutch-engaging and clutch disengaging movements of the clutch, a source of fluid pressure, and means for controlling the operation of said motor including an accelerator-operated valve operable to connect said motor and source when the accelerator is moved to release position, a second valve operatively connected with said first valve, said second valve being preadjusted to automatically reduce the pressure in said motor to a predetermined value and being adapted to be connected with the motor through the first valve when the accelerator is moved away from release position, and means for operating said second valve in accordance with variations in engine speed to regulate the further reduction of the pressure in said motor whereby the clutch will be gradually engaged.

5. In an automotive vehicle having an internal combustion engine, an accelerator and a clutch, fluid pressure power means for disengaging the clutch, means for controlling the fluid pressure deenergization of the power means for effecting clutch engagement comprising a valve preadjusted to decrease the energization of the power means a predetermined amount upon movement of the accelerator in a direction to increase engine speed, and means controlled solely by engine speed for controlling the further operation of the valve to complete the fluid pressure deenergization of said power means.

6. In combination with an automotive vehicle engine, a clutch, and a carburetor having a throttle-operating member, of a fluid pressure power device connected to the clutch, and control means for effecting fluid pressure energization and deenergization of said power device to respectively control clutch disengagement and clutch engagement, said control means including a portion operatively associated with the throttle-operating member and operative upon initial movement of the latter in one direction to decrease the fluid pressure energization of said power device to a point where the clutch is in light initial engagement, said portion being thereafter operative to decrease the fluid pressure energization of the power device solely in accordance with increases in engine speed.

7. In combination with an automotive vehicle engine, a clutch, and a carburetor having a throttle-operating member, of a fluid pressure power device connected to the clutch, and control means for conducting fluid pressure to and from the power device to respectively effect disengagement and engagement of the clutch, said control means including a valve operatively associated with the throttle-operating member, and a second valve controlled solely by engine speed.

8. In combination with an automotive vehicle engine, a clutch, and a carburetor having a throttle-operating member, of a fluid pressure power device connected to the clutch, a source of fluid pressure, a governor drivably connected with the engine, and a pair of valves for controlling the operation of said power device, one of said valves being operatively associated with said throttle-operating member and effective to connect the power device and source upon movement of the member to retracted position and the other of said valves being operatively connected with said governor for control solely thereby.

9. In combination with an automotive vehicle engine, a clutch and a carburetor having a throttle-operating member, of a fluid motor connected to the clutch, a governor adapted to be drivably connected with the engine, a pair of valves for controlling the fluid pressure energization of said motor, means for connecting one of said valves with the governor whereby the same is operable in accordance with changes in engine speed, means operatively connecting the other valve with said member means for adjusting the first named valve to maintain said motor energized to an extent sufficient to cause light initial engagement of the clutch during idling of the engine, and means controlled by the other valve for completely energizing said motor to fully disengage said clutch when the engine is idling.

10. In an automotive vehicle provided with an internal combustion engine, a gear-changing transmission, an accelerator and a clutch, fluid pressure power means for operating the clutch to cause engagement and disengagement thereof, means controlled by operation of said transmission for controlling fluid pressure energization of said power means to disengage the clutch, and other means for controlling said power means including accelerator-controlled mechanism for causing clutch-disengaging operation of the power means and for initiating clutch-engaging operation of the power means, said controlling means including means responsive solely to engine speed for controlling the remaining clutch-engaging operation of the power means after the initiation of clutch engagement.

11. In an automotive vehicle having an internal combustion engine, a gear-changing transmission, an accelerator and a clutch, fluid pressure power means for controlling the clutch-engaging and clutch-disengaging movements of the clutch, means controlled by operation of said transmission for controlling fluid pressure energization of said power means to disengage the clutch, and other means for controlling the operation of the power means including a fluid pressure system having an accelerator-controlled valve and having also a valve operable in accordance with the speed of the engine, said last named valve being operable in said system to regulate the clutch-engaging movement of said power means solely as the speed of the engine is increased.

12. In an automotive vehicle provided with an internal combustion engine, a throttle controlling member, and a clutch, a reservoir of fluid pressure, a fluid motor for operating the clutch to cause disengagement and engagement thereof, means including a valve operatively connected with the member for supplying pressure from said reservoir to said motor to disengage the clutch upon movement of the member to normal engine-idling position, a second valve pre-set to maintain fluid pressure in said motor sufficient to permit only light engagement of the clutch, means for connecting said motor and second valve upon movement of said member in a direction to increase the engine speed whereby the pressure in said motor is reduced to a valve sufficient to allow light engagement of the clutch, and means controlled solely by the speed of the engine for controlling the action of the second valve in reducing the remaining pressure in the fluid motor for allowing the clutch to become fully engaged.

ARTHUR R. LEUKHARDT.